H. H. DUNNIHOO.
DRAFT EQUALIZER.
APPLICATION FILED NOV. 5, 1908.
937,365.
Patented Oct. 19, 1909.
2 SHEETS—SHEET 1.
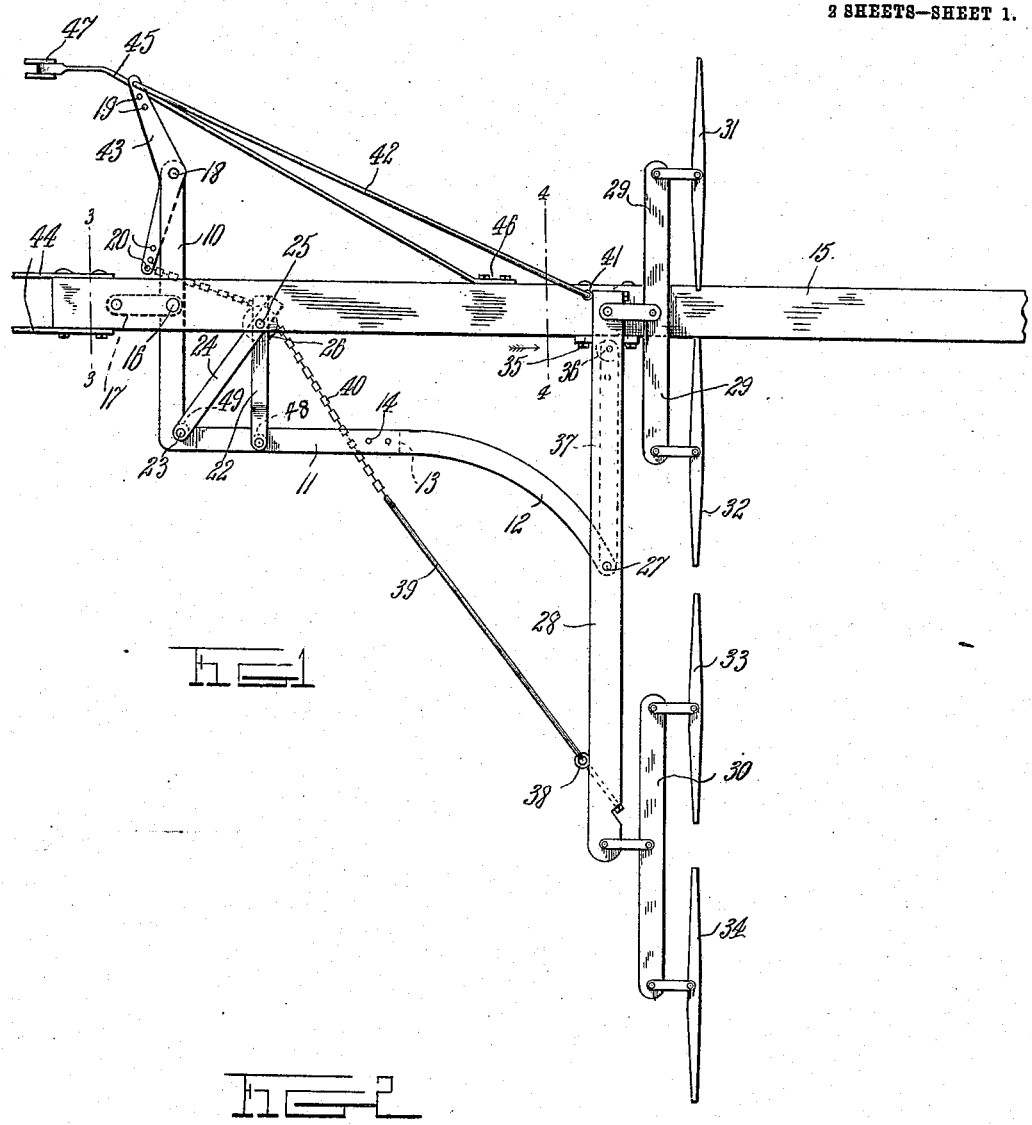
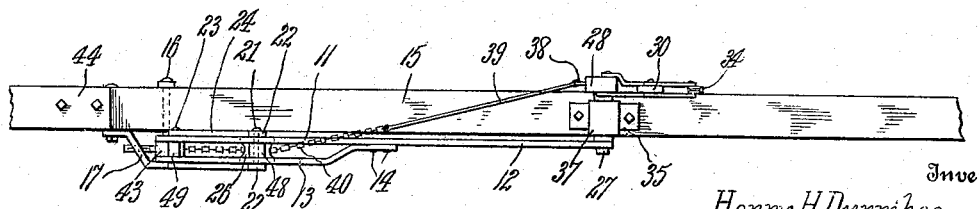
Witnesses
J. H. Crawford
C. H. Woodward
Inventor
Henry H. Dunnihoo,
By
Attorney

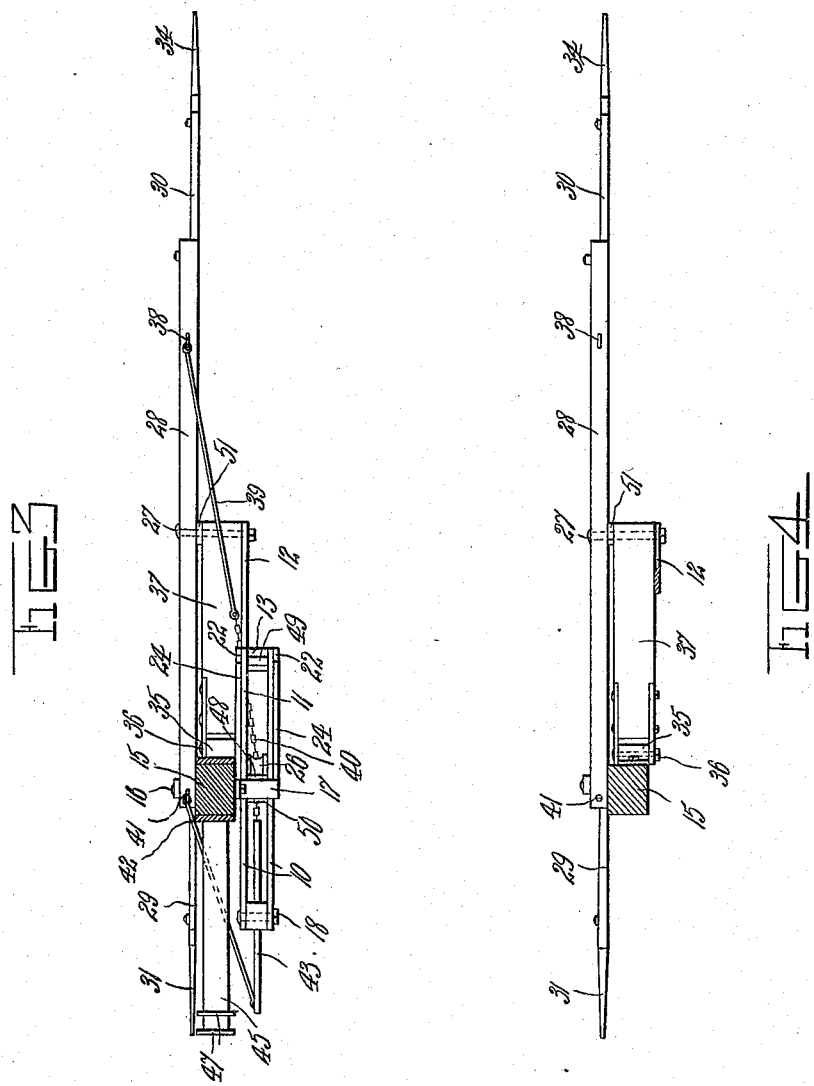

UNITED STATES PATENT OFFICE.

HENRY H. DUNNIHOO, OF SHATTUCK, OKLAHOMA.

DRAFT-EQUALIZER.

937,365.  Specification of Letters Patent.  Patented Oct. 19, 1909.

Application filed November 5, 1908. Serial No. 461,172.

*To all whom it may concern:*

Be it known that I, HENRY H. DUNNIHOO, a citizen of the United States, residing at Shattuck, in the county of Ellis, State of Oklahoma, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers employed in connection with agricultural machines of various kinds such as mowers, reapers and the larger forms of harrows, plows and the like, and has for one of its objects to improve the construction and increase the efficiency and utility of devices of this character.

Another object of the invention is to provide a device of this character wherein the strains are equalized.

With these and other objects in view, the invention consists in certain novel features of construction as hereafter shown and described, and then specifically pointed out in the claims, and in the drawings illustrative of the preferred embodiment of the invention, Figure 1 is a plan view of the improved device. Fig. 2 is a side elevation. Fig. 3 is a rear elevation in section on the line 3—3 of Fig. 1. Fig. 4 is a section on the line 4—4 of Fig. 1.

The improved device comprises a bracket element formed with two main arms 10—11 arranged at right angles to each other with the arm 11 extended in an outwardly curving form as at 12. Connected to the lower side of the bracket is an L-shaped stay member 13, the member 13 rigidly connected at 14 to the arm 11 and spaced away from the arms 10—11 as shown. The bracket element is coupled to the underside of the tongue, represented at 15, by a pin 16 the latter being supported by a stay strap 17, the pin 16 passing through the arm 10 intermediate its ends and likewise through the portion of the member 13 which is located beneath the arm 10, as shown. The members 10—11—12 together with the brace 13 and the link 37 are thus held rigidly in position, and form a supporting bracket of novel construction, and operating as hereafter explained.

Swinging at 18 between the free end of the arm 10 and the adjacent portion of the member 13 is a lever arm 43, the terminals of the member 43 having spaced apertures 19—20, the object to be hereafter explained. Connected at 21 to the outer faces of the members 11 and 13 are straps 22, and likewise connected at 23 to the elbow portions of the members 10 and 13 are straps 24, the free ends of the straps being coupled by a pin 25 upon which a chain sheave 26 is mounted, the chain sheave thus operating between the straps, as shown. The pins 21, 23 and 16 are provided with spacer tubes 48, 49 and 50, to maintain the parts in spaced position.

Connected to the tongue 15 is a bearing 35, and connected at one end at 36 in this bearing is a link 37, the opposite end of the link engaging the pin 27, by which the evener beam is connected to the bracket. A spacer block 51 is located upon the pin 27 between the members 28 and 37 to maintain them in spaced relations.

Swinging at 27 from the free end of the curved portion 12 of the bracket is an evener beam 28, the latter having double trees 29—30 swinging respectively from its ends, the double tree 29 having swingle-trees 31—32 while the double tree 30 is provided with swingle-trees 33—34 of the usual form and coupled in the usual manner. The evener beam 28 and the double trees are so arranged relative to the tongue that the swingle-tree 31 is located at one side of the tongue and the swingle-trees 32—33—34 are located at the opposite side of the tongue as shown.

Passing obliquely through the beam 28 near the double tree 30 is an eye bolt 38, and connected to this eye bolt is a rod 39, while a section of chain 40 is connected at its ends respectively to the free ends of the rod 39 and in one of the spaced apertures 20 of the swinging arms 43, the chain 40 passing through the guide sheave 26 and between the straps 22 and 24, the latter parts serving as guides to the chain and preventing displacement from the guide sheave. Passing through the inner end of the evener beam 28 is an eye bolt 41 and connected at one end to this eye bolt is a rod 42, the opposite end of the rod coupled in one of the apertures 19 of the arm 43. By this simple arrangement it will be obvious that the strains of the draft animals are equalized.

By employing the plurality of apertures 19—20 at the ends of the member 43 it will be obvious that the chain 40 and the pull rod 42 may be adjusted to adapt the improved device to any differences which may exist in the strength or weight of the draft animals, so that the draft of all of the animals may be equalized and one or more light draft animals and one or more draft animals which are heavy employed in the same "team".

The rear end of the tongue 15 is shown provided with coupling straps 44 whereby the tongue is coupled to the frame work of the machine to which it is to be connected, while a brace rod 45 is connected at one end at 46 to the tongue and at the other end to a clip 47 connected to the frame work. By this simple means the tongue is rigidly coupled to the machine frame.

The improved device is simple in construction, can be inexpensively manufactured, and applied without material structural changes to any of the various forms of machine or implements to which devices of this character are applicable.

What is claimed, is:—

1. In a draft equalizer, the combination with a draft tongue, of a bracket formed of two arms arranged at right angles to each other and connected to the tongue intermediate the ends of one of said arms, an evener beam swinging intermediate its ends from the free end of the other arm of said bracket, said evener beam adapted to support draft appliances at its end, an arm connected to swing upon the bracket at the end thereof opposite to that to which the evener beam is connected, a rod connected between one end of said swinging arm and one end of said evener beam, and a flexible element between the other end of said evener beam and the other end of said swinging arm.

2. In a draft equalizer the combination with a draft tongue, of a bracket formed of two arms arranged at right angles to each other and connected to the tongue intermediate the ends of one of said arms, a link connecting the free end of the other arm of the bracket to the tongue, an evener beam swinging intermediate its ends from the free end of said other arm of said bracket, said evener beam adapted to support draft appliances at its ends, an arm connected to swing upon the bracket at the end thereof opposite to that to which the evener beam is connected, a rod connected between one end of said arm and one end of said evener beam, a guide sheave connected to said bracket, and a flexible element between the other end of said evener beam and the other end of said swinging arm and leading over said guide sheave.

3. In a draft equalizer the combination with a draft tongue of a bracket formed of two arms arranged at right angles to each other, a stay member extending beneath both arms of the bracket and connected at the ends thereof to the same, means for connecting the stay member and one arm of the bracket to the tongue, means for connecting the other arm of the bracket to the tongue, an evener beam mounted to swing from said bracket at its forward end, an arm connected to swing between the stay member and the bracket at the rear end thereof, a rod connected between one end of said swinging arm and one end of said evener beam, and a flexible element between the other end of said evener beam and the other end of said swinging arm.

4. In a draft equalizer the combination with a draft tongue of a bracket formed of two arms arranged at right angles to each other, a stay member extending beneath both arms of the bracket and connected at the ends thereof to the same, means for connecting the stay members and one arm of the bracket to the tongue, means for connecting the other arm of the bracket to the tongue, an evener beam mounted to swing from said bracket at its forward end, an arm connected to swing between the stay member and the bracket at the rear end thereof, a rod connected between one end of said swinging arm and one end of said evener beam, bars connected at one end to said bracket and to said stay member, a guide sheave carried by said bars at their free ends, and a flexible element connected to said evener beam and to said swinging arm and leading over said guide sheave.

In testimony whereof, I affix my signature, in presence of two witnesses.

HENRY H. DUNNIHOO.

Witnesses:
M. J. EWING,
PERRY J. MORRIS.